US008081953B2

United States Patent
Han et al.

(10) Patent No.: US 8,081,953 B2
(45) Date of Patent: Dec. 20, 2011

(54) METHOD FOR PROVIDING PICTURES TO A DIGITAL FRAME BASED ON HOME NETWORKS

(75) Inventors: Sang-Ok Han, Seoul (KR); Woo-Seung Lee, Seoul (KR); Sang-Su Sim, Incheon (KR); Suck-Kyun Kim, Seoul (KR); Yoon-Su Yi, Seoul (KR); Chang-Il Rho, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 452 days.

(21) Appl. No.: 11/909,439

(22) PCT Filed: Mar. 22, 2006

(86) PCT No.: PCT/KR2006/001049
§ 371 (c)(1),
(2), (4) Date: Oct. 14, 2009

(87) PCT Pub. No.: WO2006/112614
PCT Pub. Date: Oct. 26, 2006

(65) Prior Publication Data
US 2010/0029253 A1 Feb. 4, 2010

(30) Foreign Application Priority Data
Mar. 23, 2005 (KR) .......................... 10-2005-0023944

(51) Int. Cl.
*H04M 1/66* (2006.01)
(52) U.S. Cl. .................. 455/411; 455/426.1; 455/435.1; 455/557; 348/14.01; 713/168
(58) Field of Classification Search .................. 455/411, 455/426.1, 435.1, 557; 348/14.01, 14.02; 713/161, 168
See application file for complete search history.

(56) References Cited

U.S. PATENT DOCUMENTS

| 6,701,302 | B1 * | 3/2004 | Schaeffer et al. ............ 705/26.8 |
| 7,173,626 | B2 * | 2/2007 | Akiyoshi et al. .............. 345/475 |
| 8,010,987 | B2 * | 8/2011 | Nygaard et al. .............. 725/105 |
| 2004/0073689 | A1 * | 4/2004 | Aoki et al. .................... 709/229 |

(Continued)

FOREIGN PATENT DOCUMENTS

JP  2002-041822  2/2002

(Continued)

OTHER PUBLICATIONS

Korean Office Action for 10-2005-0023944.

(Continued)

*Primary Examiner* — Kamran Afshar
*Assistant Examiner* — Dung Lam
(74) *Attorney, Agent, or Firm* — Lowe Hauptman Ham & Berner LLP

(57) ABSTRACT

A method for providing pictures to a digital frame based on home networks is disclosed. A frame service server receives an image information message from user equipment which connects with a specific number. The frame service server grasps an IP of an RG installed in a home of a service destination by searching identification information included in the image information message at an RG identification table. The frame service server transmits the image information message including port number information to the IP of the RG, which is selected for informing the frame service. The RG transmits the image information to a digital frame so that the digital frame displays the image information.

11 Claims, 8 Drawing Sheets

U.S. PATENT DOCUMENTS

2006/0075349 A1 * 4/2006 Gay et al. .................. 715/751

FOREIGN PATENT DOCUMENTS

| JP | 2004-266310 | 9/2004 |
|---|---|---|
| JP | 2005-512357 | 4/2005 |
| JP | 2007-521527 | 8/2007 |
| JP | 2008-527543 | 7/2008 |
| KR | 1020020022749 | 3/2002 |
| KR | 1020020082655 | 10/2002 |
| KR | 20-0355362 | 8/2003 |
| KR | 1020050014329 | 2/2005 |
| WO | 00/58817 | 5/2000 |
| WO | 01/22390 | 3/2001 |

OTHER PUBLICATIONS

Japanese Office Action for 2008-502909.

* cited by examiner

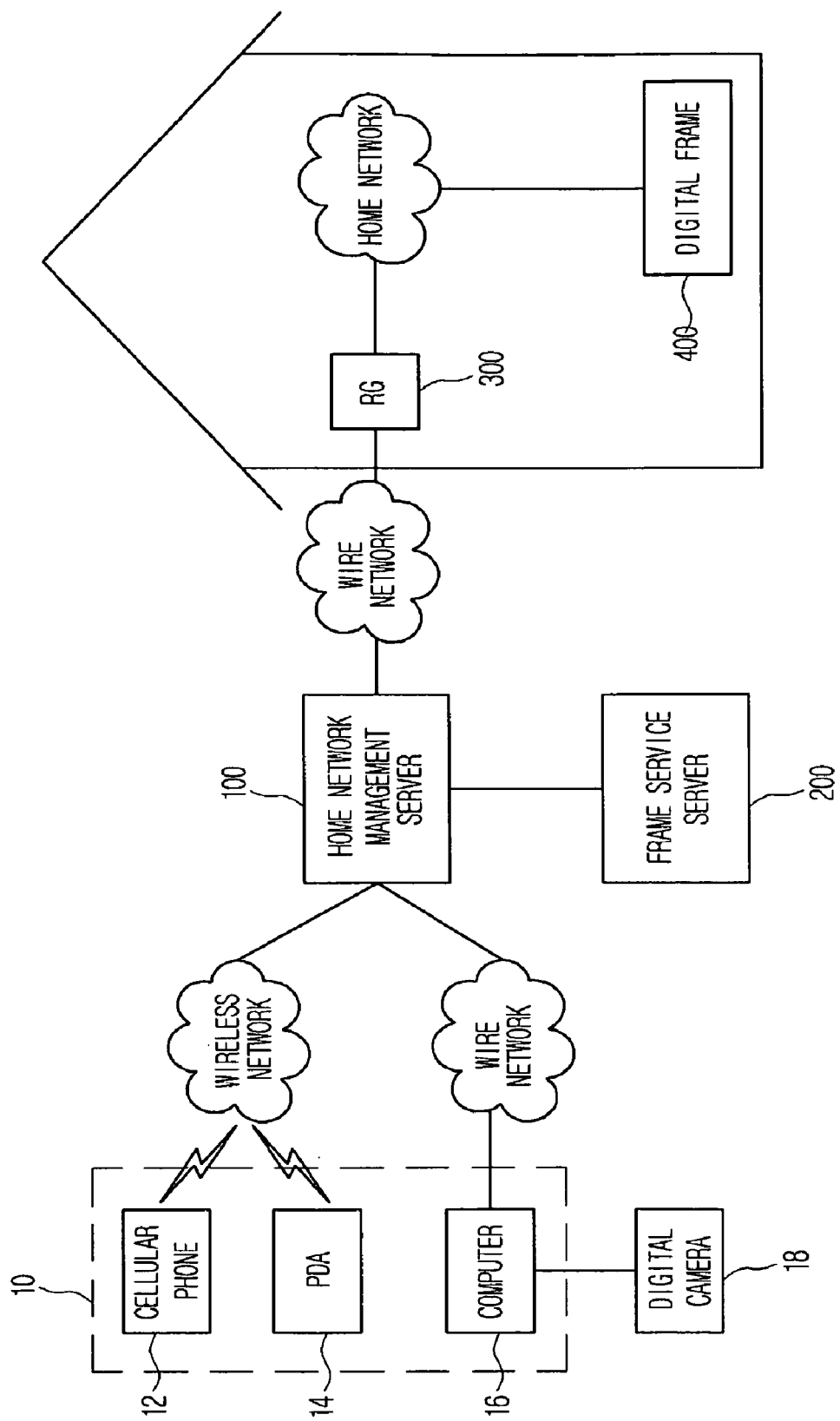

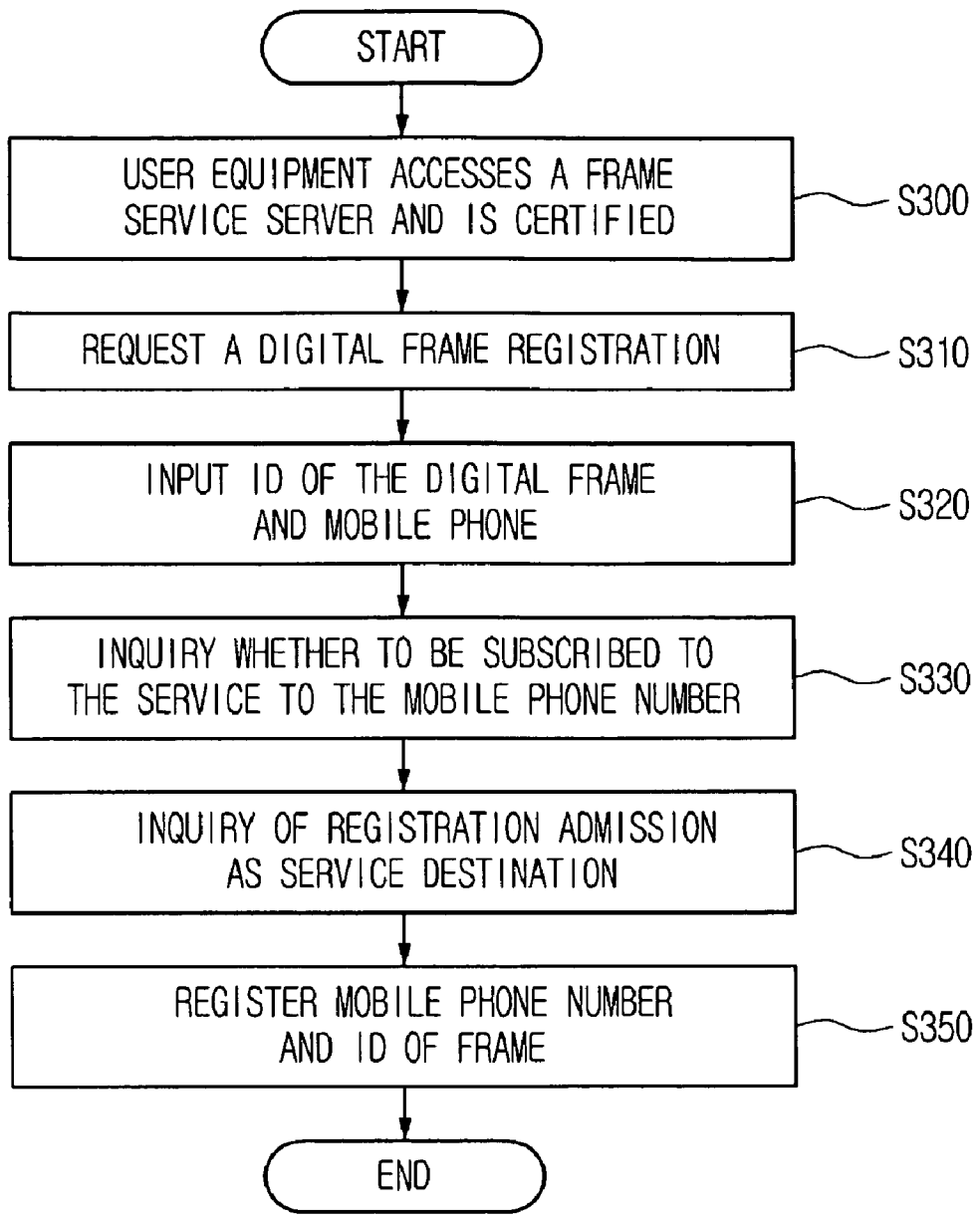
[Fig. 2]

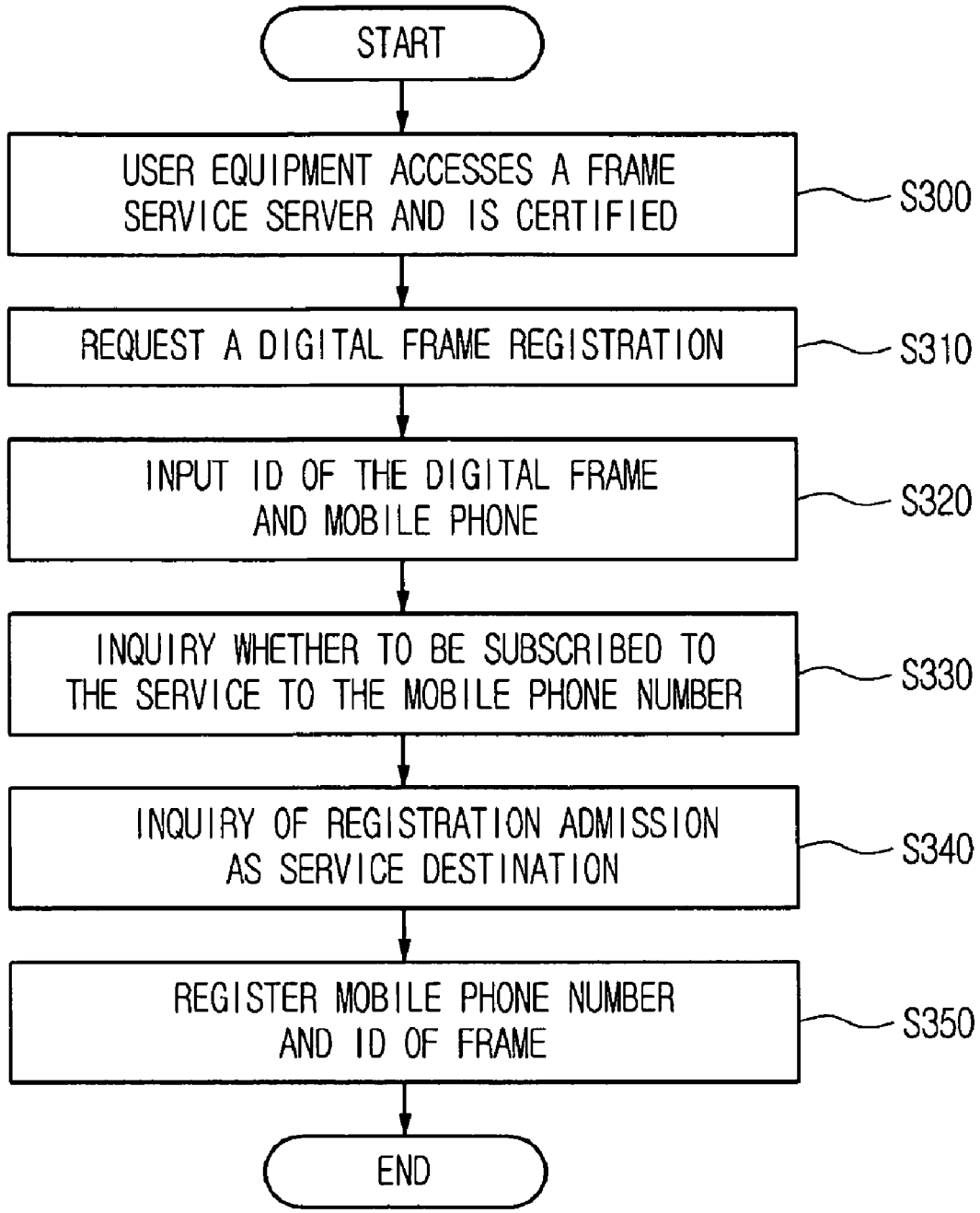

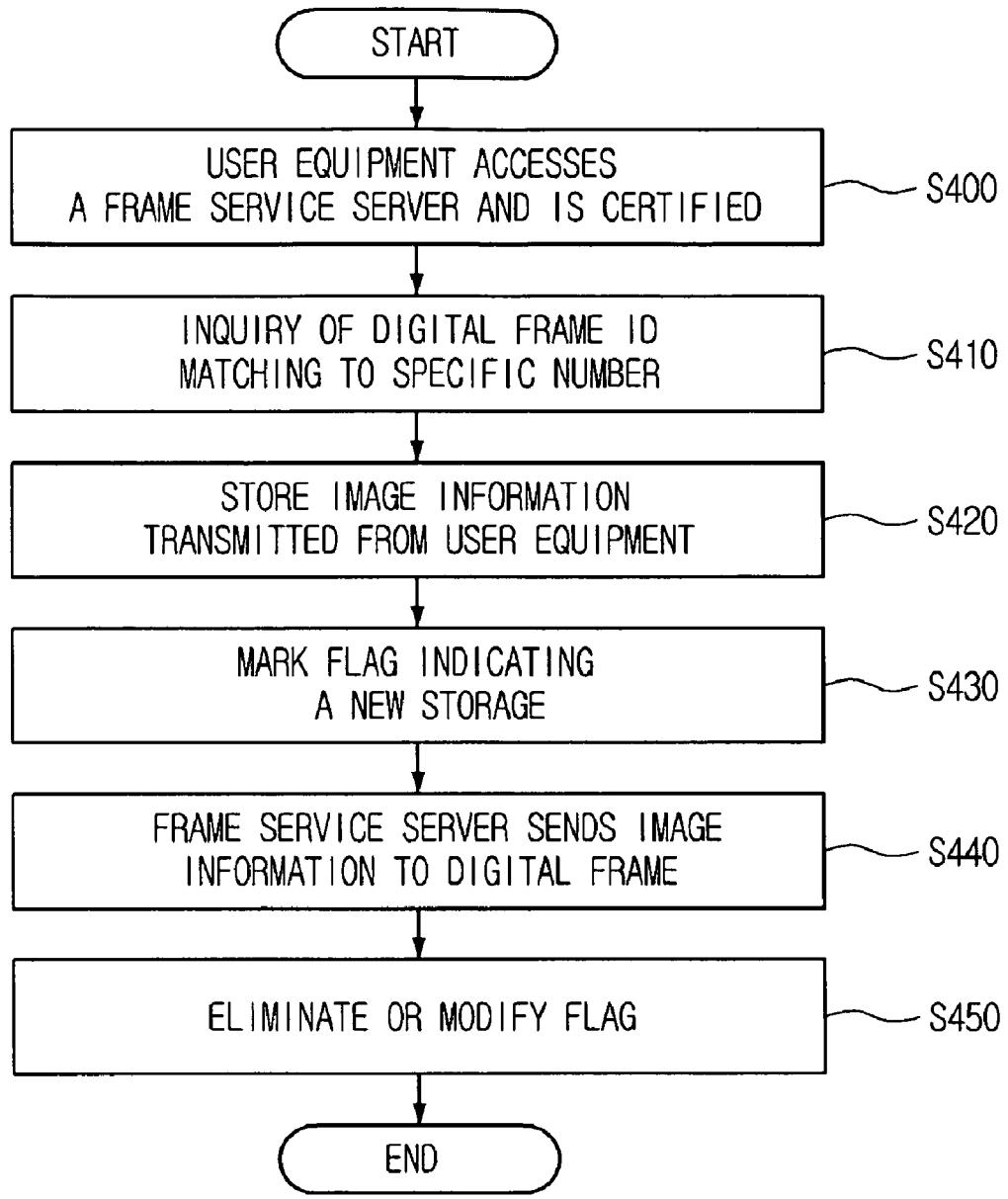

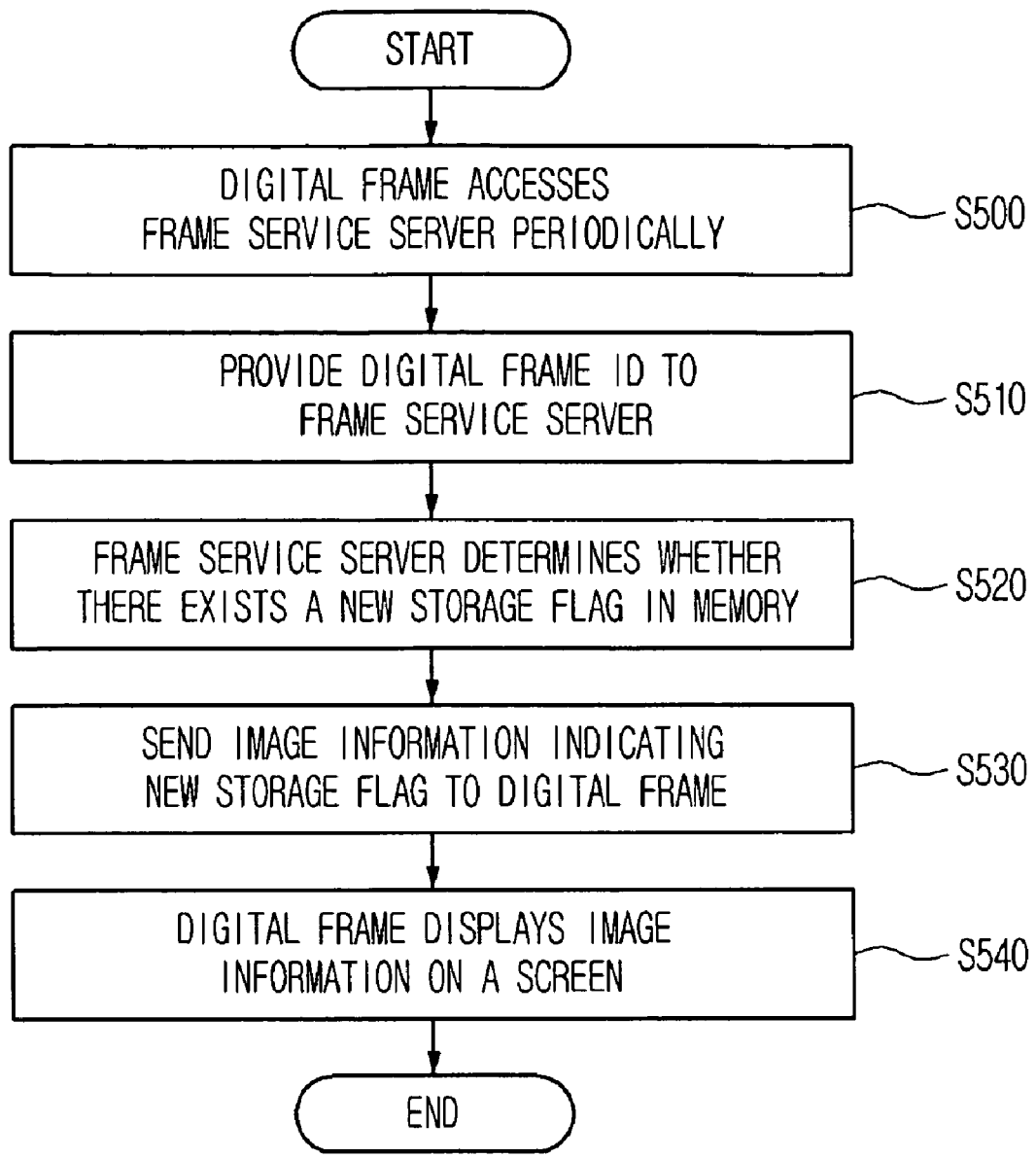

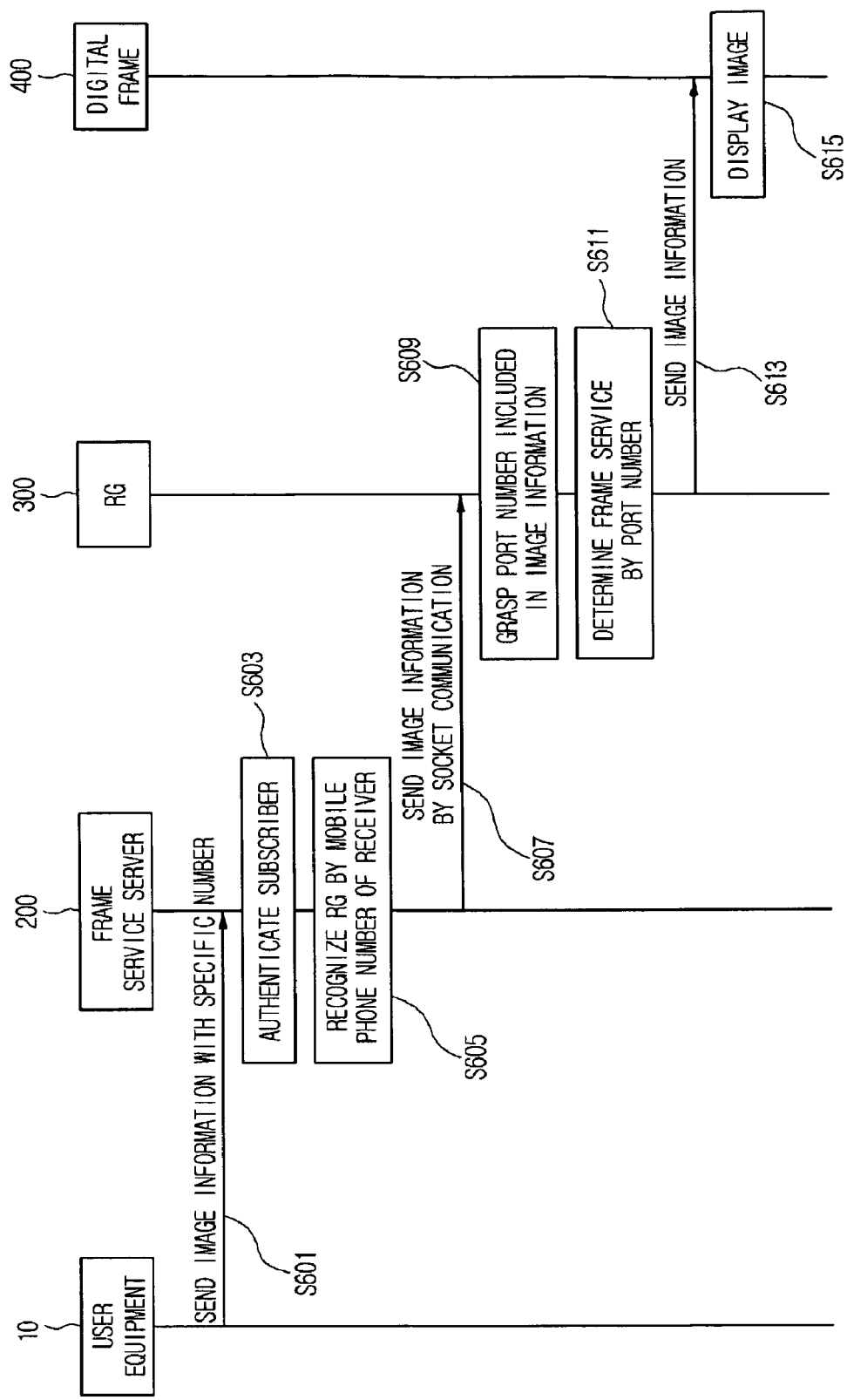

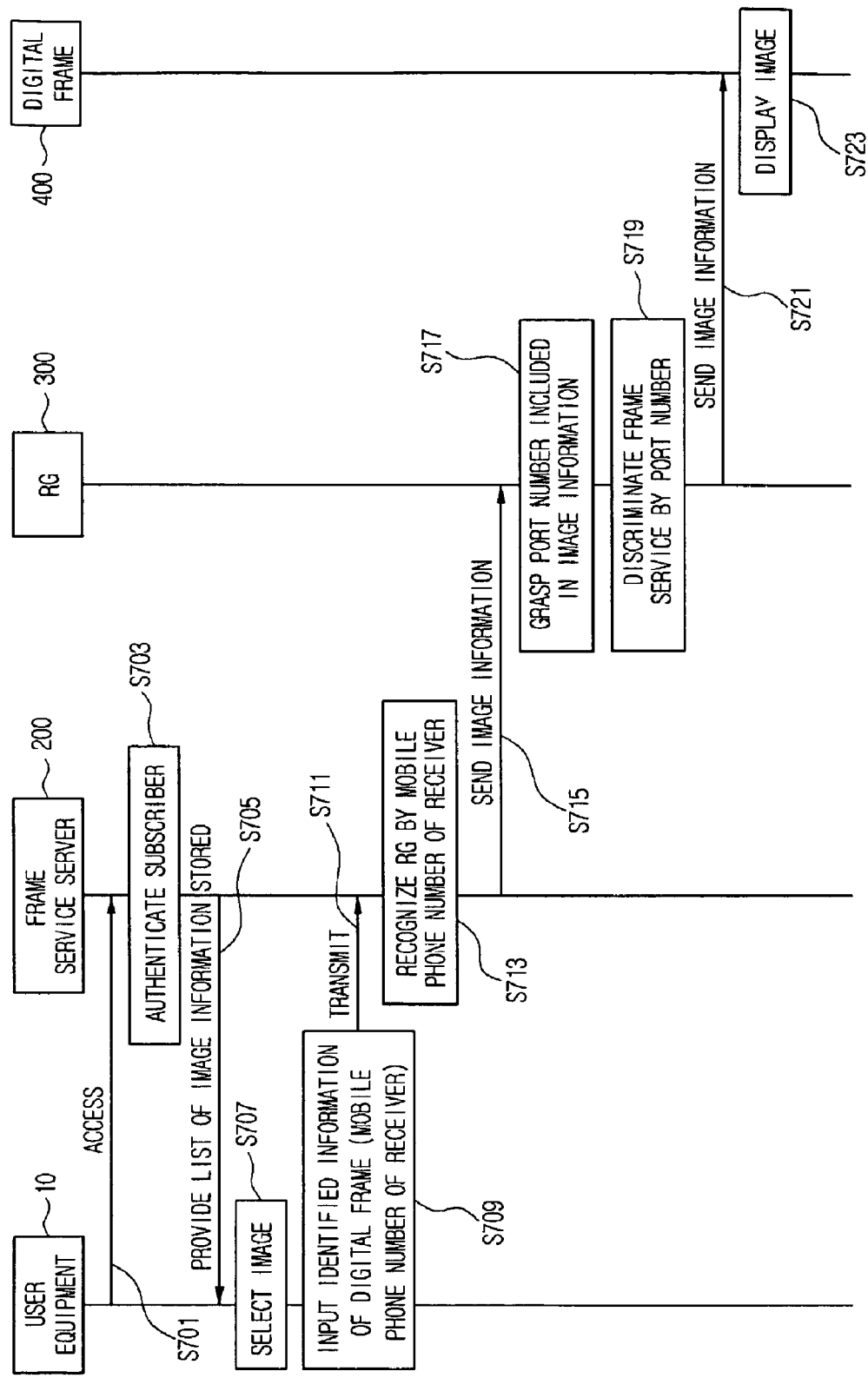
[Fig. 7]

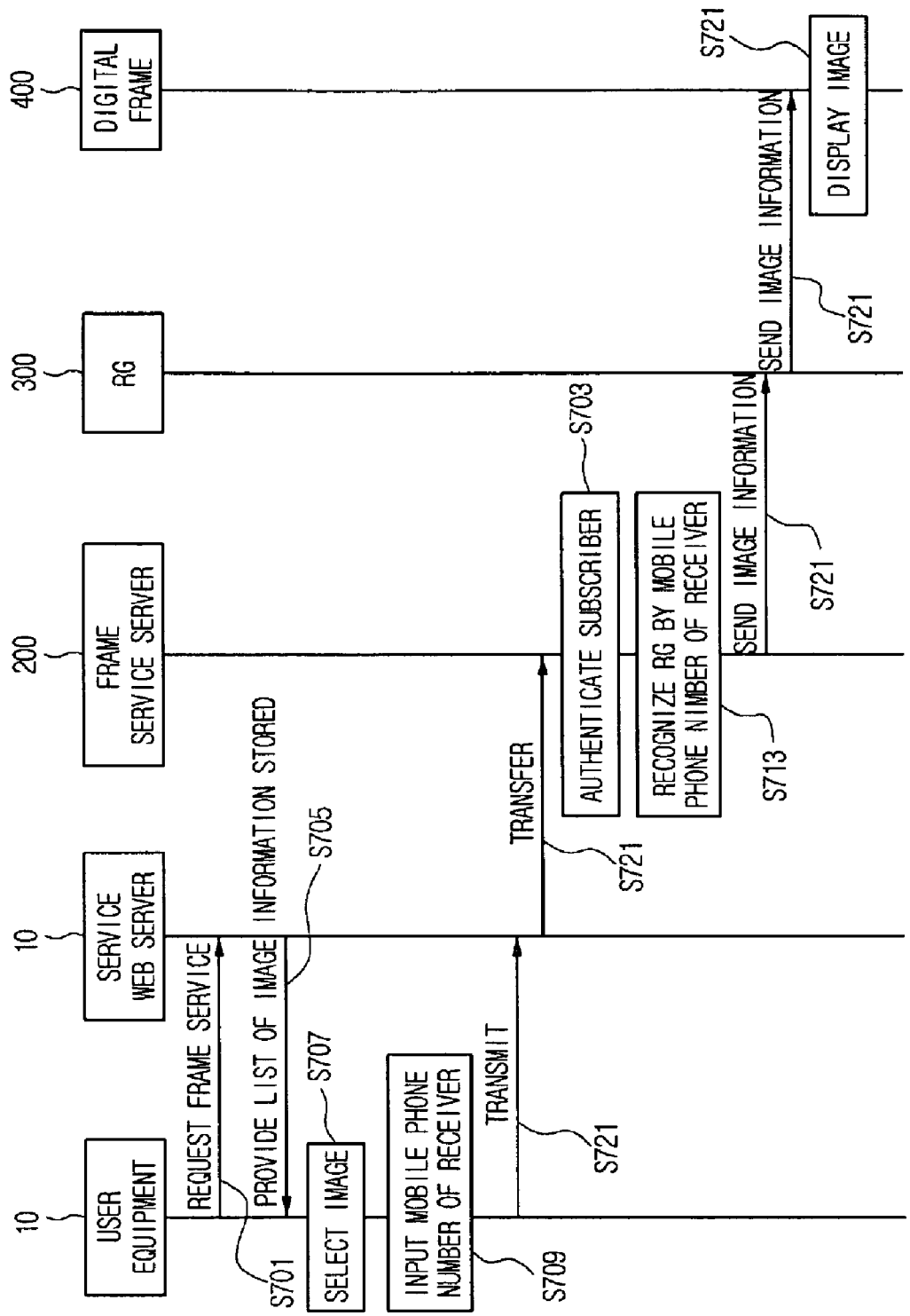

METHOD FOR PROVIDING PICTURES TO A DIGITAL FRAME BASED ON HOME NETWORKS

CROSS REFERENCE TO RELATED APPLICATION

This application is the National Phase application of International Application No. PCT/KR2006/001049, filed Mar. 22, 2006, which designates the United States and was published in English. This application, in its entirety, is incorporated herein by reference.

TECHNICAL FIELD

The present invention is related to a digital frame displaying digital images, and in particular to a method and a recording medium for providing multimedia data, for examples pictures, movies, characters, letters etc., which are stored in a digital camera, a cellular phone including a camera, or a web server to the digital frame connected to a home network located in a household.

BACKGROUND ART

Generally, a user takes and prints photographs, and then puts the photographs in a frame or slips the photographs in an album. A digital camera or a camera phone can store the photographs as digital data. Also, the user can visually confirm the photographs through the camera, the camera phone, a computer, or a digital frame, etc. without printing the photographs. The digital frame has a memory itself and displays photographs stored through the LCD screen. The digital frame displays the stored photographs in order or displays the photographs provided by the computer, the digital camera, or the camera phone.

Ubiquitous gets a user to communicate any time and any where by an advanced communication technology. The home network which receives and transmits any kind of information in a home is realized by using the ubiquitous. The home network operates by using a public IP, and communicates between electronic devices in the home. The home network also connects to a wireless network or Internet so the home network communicates with external devices.

When the home network is generalized, the digital frame will operate based on the home network. It is possible that the photographs are transmitted in real time through the digital camera or the camera phone which is connected over a wire/wireless network and the digital frame displays the photographs stored in an Internet server.

It is published that the digital frame has a modem function that enables it to receive and display the photographs provided from the Internet server. However, a wire/wireless communication method between the Internet server and the digital frame is not published. Essentially, a service method for the digital frame based on the home network which operates by the virtual private network is not presented yet.

DISCLOSURE OF INVENTION

Technical Problem

The present invention is directed to solve the problems described above, and an object of the invention is to provide a digital frame based on a home network in which pictures taken by a cellular phone or a digital camera, and/or multimedia data provided by a computer are displayed.

Technical Solution

A method for providing pictures to a digital frame connected to home networks according to the first aspect of the present invention includes:

A-1) matching a phone number of a mobile terminal belonging to a service destination and a digital frame ID, and recording it into an identification table for a subscriber in a frame service server connected to a home network according to a request of a user equipment connected through a wire or wireless network;

A-2) providing a list of the digital frame ID belonging to other people, which is registered in the identification table for the subscriber, and recording the digital frame ID selected by the user equipment as a specific destination in the frame service server;

A-3) grasping the specific destination through the identification table for the subscriber and storing image information into a memory area allocated to the specific destination when the frame service server receives the image information from the subscriber connected as the specific number over a wire or wireless network;

A-4) grasping the digital frame ID when the frame service server receives a transmission demand of the image information through the wire network from the digital frame connected to the home network; and A-5) searching the image information that is newly stored in the memory area matching the digital frame ID, and downloading the image information to the digital frame.

A method for providing pictures to a digital frame connected to home networks according to the second aspect of the present invention includes:

B-1) transmitting an image information stored in a user equipment and an image information message including identification information of a service destination to a frame service server from the user equipment through a wire or wireless network;

B-2) executing an authentication process through the image information message in the frame service server;

B-3) inputting the identification information of the service destination into an RG (Residential Gateway) identification table, when the authentication of a subscriber succeeds;

B-4) inquiring an IP of the RG matching the identification information of the service destination in the RG identification table, and transmitting the image information message to the IP of the RG from the frame service server, wherein the image information includes the port number information which is determined for informing a frame service; and B-5) transmitting the image information to a digital frame connected to the home network through the port number which is included in the received image information;

The RG connects the home network and a public network so that the frame service server connected to the public network can communicate with the digital frame.

A method for providing pictures to a digital frame connected to home networks according to the third aspect of the present invention includes:

C-1) authenticating a user equipment by using a subscriber identification information provided from the user equipment in a frame service server;

C-2) providing a list of image information stored in a memory area corresponding to the subscriber identification information of the user equipment when the authentication succeeds in the frame service server;

C-3) transmitting selected information related to at least one image selected in the image information list and transmitting a demand message for requesting transmission to the frame service server from the user equipment, wherein the demand message includes the identification information of the service destination;

C-4) inputting the identification information of the service destination into the RG identification table and grasping an IP of the RG (Residential Gateway) matching the identification information of the service destination in the frame service server;

C-5) transmitting the image information message to the IP of the RG from the frame service server, wherein the image information includes port number information which is determined for informing a frame service;

C-6) transmitting the image information to a digital frame connected to the home network through the port number which is included in the received image information;

The RG connects between the home network and a public network so that the frame service server connected to the public network can communicate with the digital frame.

Advantageous Effects

According to the present invention, the user can transmit photographs taken by a cellular phone with a camera or a PDA to a digital frame which is operated based on a home-network, and can display multimedia data provided by a computer or a web server on the digital frame in real time.

BRIEF DESCRIPTION OF THE DRAWINGS

FIG. 1 is a block diagram showing a network surrounding according to the present invention.

FIG. 2 is a flowchart showing a process for subscribing to the service according to the present invention.

FIG. 3 is a flowchart showing a recording process of digital frames of other people according to a request of a subscriber.

FIG. 4 is a flowchart showing a process of storing image information of a subscriber provided by a specific number in a memory of a specific destination according to one embodiment of the present invention.

FIG. 5 is a flowchart showing a process in which image information registered in a frame service server is provided to a digital frame according to an embodiment of the present invention.

FIG. 6 is a flowchart showing a providing method of a digital frame service based on a home-network by using a push method according to an embodiment of the present invention.

FIG. 7 is a flowchart showing a providing method of a digital frame service based on a home-network by using a push method according to another embodiment of the present invention.

FIG. 8 is a flowchart showing a providing method of a digital frame service based on a home-network by using a push method according to yet another embodiment of the present invention.

MODE FOR THE INVENTION

Referring to the attached drawings, the preferred embodiment according to this invention will be explained.

FIG. 1 is a block diagram showing a network surrounding according to the present invention. Referring to FIG. 1, a network system of the present invention includes user equipment 10, a home network management server 100, a frame service server 200, an RG (Residential Gateway) 300, and a digital frame 400.

The user equipment 10 is preferred to a mobile terminal, for example a cellular phone 12 or PDA (Peopleal Digital Assistants) 14, etc. which is equipped with a camera function and stores photographs taken by the camera as digital data, and wirelessly communicates the digital data via a mobile communication network. The user equipment 10 can be a computer 16 which receives and stores the digital data taken by the cellular phone 12, PDA 14, or a digital camera 18, and is connected to a home network management server 100 via the Internet.

The home network management server 100 is connected to the Internet and the mobile communication network, and authenticates users who wish to access the home network, and manages the subscribers registered thereto. In particular, the home network management server 100 is connected to a frame service server 200 via a core network and authenticates the subscribers of a frame service.

The frame service server 200 receives and stores the image information from the user equipment 10 through a wire or wireless network. And the frame service server 200 transmits the stored image information to the digital frame which is designated by a user. The frame service means a service of providing the image information (for example, photos, moving images, etc.) transmitted from the user equipment 10 to a predetermined digital frame connected to a home network. The frame service server 200 allocates a memory for storing the image information to a new subscriber when the new subscriber is registered thereto. Also the frame service server 200 is connected to an RG 300 for accessing the home network via a wire network.

The RG 300 is an end device of an IP network and supports data communications between the digital frame 400 connected to the home network and the frame server 200. The digital frame 400 is composed of a memory for storing multimedia data such as images, movies, music, text, etc., and a displaying means for showing the image information on display. For constructing the home network, wire/wireless LAN, wire cables, a Local Area Network such as a Zig Bee, a Bluetooth, network etc. are needed.

The present invention using the network constructed as mentioned above provides the frame service by using two methods.

By using a pull type in the first method, the digital frame 400 designated by the user equipment accesses the frame service server 200 and receives image information provided from the user equipment. By using a push type in the second method, the user equipment transmits the image information to the digital frame 400.

Therefore, we are explaining the methods using the pull type and the push type respectively according to the present invention.

Referring to FIG. 2, a process for subscribing to a frame service is explained. FIG. 2 is a flow chart for illustrating the subscribing processing according to the present invention.

User equipment 10 which accesses a home network management server 100 via a wire network or wireless network, requests to become a member of the home network service provided by the home network management server (Step 210 and Step 220). The user equipment 10 should provide private information, identification (ID), a password, and a number of a mobile terminal in processing the subscription to the home network management server 100. The number of the mobile terminal is used to identify a user of the mobile terminal connected to the home network management server 100 via a wireless network. The ID and the password are used to identify the user of a computer 16 connected to the home network management server 100 via a wire network.

When the home network is constructed in a home, the user equipment 10 subscribed in the home network service registers an IP of the RG 300 for operating the home network to the home network management server 100 so that the IP is matched to the user identifier information and stored it. Although the home network has been constructed in a home, if the user equipment 10 is not subscribed to, the registering process of the IP of the RG 300 does not take place. In another example, when the user equipment 10 is not a subscriber of the home network service, the service destination can be a general Internet user, and the service is registered and is provided through the same process to the general subscriber and non-subscriber of the home network.

The user equipment 10 subscribed for the home network service applies a frame service among the home network service provided by the home network management server 100 (step 230). The home network management server 100 can register the user equipment 10 with the frame service without requesting any additional information to the subscriber. However, the general Internet user should provide an ID of the service destination, i.e. the digital frame to receive the image information, and specification information of the digital frame, and a phone number of the mobile terminal related to the digital frame to the home network management server 100. The user can apply for the frame service after recording or simultaneously with recording as the subscriber to the home network management server 100.

The user who has completed the above mentioned process is registered as a subscriber of the frame service and is managed by the home network management server 100. The home network management server 100 provides the subscriber information applied for the frame service to the frame service server 200 (step 240).

In an application example, the user can apply for the frame service in the frame service server 200. In this case, the frame service server 200 provides information of new subscribers to the home network management server 100.

When the application of the frame service is completed, the frame service server 200 allocates a memory for storing images of the user and manages an identification table for the subscriber which is created by matching the phone number of the mobile terminal and the ID of the digital frame when the subscriber access the Internet.

Referring FIG. 3 through FIG. 5, one embodiment using the pull type will be explained according to the present invention.

A pull type is used when the user equipment 10 can not directly transmit image information which is sent by the user equipment 10 to a receiver, i.e. a digital frame of the service destination. In other words, the pull type is used when the frame service server 200 does not know a transmission channel of the digital frame because it does not recognize the digital frame.

When the subscriber of the home network service applies for the frame service, the IP of the RG 300 connected to the digital frame 400 is registered, but when the non-subscriber of the home network service such as an Internet subscriber applies for the frame service, the IP of the RG 300 is not registered or the RG 300 does not exist. In these cases, the pull method is used for the frame service to the general Internet subscriber.

FIG. 3 is a flowchart showing a recording process of digital frames by request of other people according to a request of a subscriber.

A frame service server 200 creates an identification table for subscribers wanting to join a frame service, which only records an ID of the subscribers own digital frame.

In this condition, the frame service server 200 requests authentication of user equipment 10 to the home network management server 100 when the user equipment 10 connects the frame service server 200 (step 300).

When the user equipment 10 requests registering of the digital frame to the frame service server 200 after the authentication of the user equipment 10 is completed, the frame service server 200 requests the ID of the digital frame which will be recorded, and the phone number of the mobile terminal of the user equipment 10 (step 310, step 320).

When the frame service server 200 receives the phone number of the mobile terminal and determines that the phone number is not in the identification table, the frame service server 200 asks whether the user of the mobile terminal is the subscriber of the home network service to the home network management server 100 and receives the response (step 330). In this case, the phone number of the mobile terminal may be a phone number of a friend, a relative, etc. When the user of the mobile terminal is not the subscriber of the home network service, the frame service server 200 cancels the registration of the digital frame related to the mobile terminal. When the user of the mobile terminal is the subscriber of the home network service, the frame service server 200 transmits an SMS message, including a query whether to accept a registration to the mobile terminal, informing that the digital frame related to the mobile terminal will be recorded as the destination of the frame service (step 340).

In response to permission to register from the mobile terminal, the frame service server 200 records the phone number of the mobile terminal with the ID of the digital frame on the identification table for the subscription (step 350). If the mobile terminal rejects the registration, the frame service server 200 cancels the registration of the digital frame related to the mobile terminal.

In the above explained method, the user can register the digital frames as the service destination, which are belonged by other people.

The frame service according to the present invention can get the image information that is taken by the mobile terminal to be registered in the frame service server 200 in real time. In this case, a specific number should be allocated to the frame service server 200 and the subscriber determines the destination (i.e. the digital frame) before hand corresponding to the specific number, which receives the image information in advance. The specific number is used to directly connect to the frame service server 200.

Therefore, the frame service server 200 reads the IDs of the digital frames in the identification table for the subscribers and provides a list of the IDs to the subscribers. The frame service server 200 registers at least one of the digital frames selected by the subscriber and manages the digital frames as the specific destination.

FIG. 4 is a flowchart showing a process of storing image information of the subscriber provided by a specific number in a memory of a specific destination according to one embodiment of the present invention.

When user equipment 10 accesses a frame service server 200 by using a specific number, the frame service server 200 provides a phone number of the user equipment 10 or IP and password to a home network management server, and demands authentication of the user equipment 10 (step 400).

The frame service server 200 recognizes the subscriber by using the phone number or the IP and password after the authentication of the user equipment 10 is completed, and reads the identification table for the subscribers. And then the frame service server 200 inquires the ID of the digital frame related to the specific destination which is selected by the subscriber in the identification table for the subscribers (step 410).

The frame service server 200 finds the ID of the digital frame, the specific destination and stores the image information transmitted from the user equipment 10 in the memory for the image which is managed by the found ID of the digital frame (step 420). The frame service server 200 confirms the required information of the digital frame to which the image information will be provided, and stores the image after transforming the image according to the specifications required by the digital frame.

The frame service server 200 marks a flag by matching the new image information when the new image information is stored in the memory for the image (step 430). The marked flag is eliminated or the type of marked flag is modified, when the frame service server 200 transmits the new image information to the predetermined digital frame 400.

The frame service server 200 easily recognizes which one is provided to the pre-determined digital frame by marking the flag on the new image information.

Furthermore, the user equipment 20 of the present invention connects to the frame service server 200 through a service menu which is internally provided by the user equipment. And the frame service server 200 selects the wanted digital frame in the ID list of the digital frame which is registered in the identification table. And then the frame service server 200 stores the image information into the memory managed by using the selected ID of the digital frame.

In the frame service of the present invention, the frame service server 200 can store the image information saved in a computer. The technology for storing specific data in the frame service server 200 by using the computer is already known in this art so we will not mention it any more.

FIG. 5 is a flowchart showing a process in which an image information registered in a frame service server is provided to a digital frame according to an embodiment of the present invention.

A digital frame 400 operates every predetermined period and accesses a frame service server 200 through an RG 300 or an ADSL (step 500). The digital frame 400 that accesses the frame service server 200 transmits an image information demand message to the digital frame, wherein the image information demand message includes an ID of the digital frame (step 510).

The frame service server 200 grasps the ID of the digital frame from the image information demand message received by the digital frame 400, and judges whether there exists a new flag stored in the memory for the image, which is managed by the ID of the digital frame (step 520).

If the image information has a new flag stored, the frame service server 200 determines the image information where the flag is marked as the new image information, and downloads the image information to the digital frame 400 through the RG 300 or the ADSL (step 530).

The digital frame 400 receives and stores the image information from the frame service server 200, and displays the image information on a screen so that a subscriber can confirm the image information (step 540).

FIG. 6 is a flowchart showing a providing method of a digital frame service based on a home-network by using a push method according to an embodiment of the present invention.

Communication between a frame service server 200 and a digital frame 400 will be explained briefly, before explaining an embodiment of the present invention according to the push type.

A phone number of a mobile terminal is used as an identifier of a digital frame for transmitting image information to a digital frame 400 by using the push type of the present invention. The mobile terminal belongs to an owner or a family (hereinafter referred to as destination) of the digital frame.

The digital frame 400 is constructed with a public network such as a home network so that the user equipment 10 or the frame service server 200 can not access the digital frame 400 and can transmit the data through an RG 300 connected to the digital frame. Therefore, the frame service server 200 manages by matching the phone number of the mobile terminal and the IP information of the RG 300 as an RG identification table. The mobile terminal belongs to the destination and has a phone number by which the digital frame 400 recognizes.

The IP information of the RG 300 is matched with one of the phone numbers of the mobile terminal belonging to a family. The subscriber of the frame service provides his own phone number and the IP of the RG installed in the home when the user subscribes to the frame service.

The RG 300 informs the frame service server 200 of a new public IP when a flexible IP is changed by ISP after allocating the IP first, and asks the registered IP to be updated by the new public IP to the frame service server 200.

The RG 300 and the digital frame 400 execute a socket communication using a specific port number in order to transmit the image information to the digital frame 400 from the RG 300. The frame service server 200 knows that the specific port number is regulated for the frame service.

In this case, the push method according the present invention is as follows.

In order to transmit image information to a specific digital frame 400 through user equipment 10, the user equipment 10 requests a frame service by inputting a specific number and a phone number of a mobile terminal for distinguishing the digital frame (step 601).

The frame service server 200 extracts the phone number of the user equipment 10 from the image information which is received through the specific number and transmits the extracted phone number of a caller to a home network management server 100 for requesting authentication of the caller (step 603). The frame service server 200 can request the authentication of not only the caller but also the destination by using the phone number of the destination to the home network management server 100.

The frame service server 200 extracts the phone number of the destination from the received image information message and discriminates the phone number as an identifier of the digital frame 400 accordingly as the subscriber authentication of the caller and/or the destination succeeds. And the frame service server 200 inputs the phone number of the destination into an RG identification table so that it confirms an IP of the RG 300 which matches the phone number (step 605).

The frame service server 200 transmits the image information message to the RG 300 and a specific port number which is determined for informing a frame service (step 607).

The RG 300 grasps the specific port number included in the image information message and determines whether the image information is provided for the frame service by the specific port number. If the RG 300 determines that the image information is provided for the frame service, the RG 300 provides the image information to the digital frame 400 (step 609, 611, and 613)

The digital frame 400 stores and displays the received image information on the screen (step 615).

The push method can use the specific destination selecting function as illustrated in FIG. 5. When the user equipment 10 provides the image information by using the specific number, the frame service server 200 grasps the RF ID of the specific number registered by choice of the user and provides the image information to the digital frame through each RG.

Referring to FIG. 7, another embodiment of the present invention using the push method is illustrated. FIG. 7 is a flowchart showing a providing method of a digital frame service based on a home-network by using the push method according to another embodiment of the present invention. In this case, image information stored in a frame service server 200 is provided to a specific digital frame.

User equipment 10 can transmit the image information to a digital frame 400 in real time and can store the image information into a frame service server 200 directly or by using a peripheral device such as a computer 16.

In order to transmit a specific image from the image information stored in the frame service server 200 to the digital frame 400, the user equipment 10 accesses the frame service server 200 through a wire network or wireless network (step 701). When the user equipment 10 is connected to the frame service server 200, the frame service server 200 executes authentication of the user by the home network management server 100 (step 703). The frame service server 200 provides a list of the image information which is stored in a memory for a subscriber image to the user equipment 10 when the authentication succeeds (step 705).

The user equipment 10 selects at least one in the image information list and transmits the phone number of the receiver, the mobile terminal (hereinafter referred to as destination phone number) to the frame service server 200 in order to distinguish the digital frame by which the image information is received (step 707 and 709). The user equipment 10 transmits the image information and a demand message for requesting transmission including the destination phone number to the frame service server 200 (step 711).

The frame service server 200 extracts the destination phone number from the demand message for requesting transmission and discriminates the destination phone number as an identifier of the digital frame 400 according to the receipt of the demand message for requesting transmission from the user equipment 10. The frame service server 200 inputs the destination phone number into an RG identifier table in order to distinguish an RG 300 matching the destination phone number, and confirms an RG IP matching the destination phone number (step 713). The frame service server 200 transmits the image information to the RG 300 corresponding to the recognized IP, and transmits also the specific port number for informing that the image information is provided for the frame service (step 715).

The RG 300 grasps the specific port number included in the image information message received from the frame service server 200, and discriminates whether the service is the frame service or not so that the image information is provided to a digital frame 400 (step 717, 719, and 721).

The digital frame 400 stores the received image information and displays it on a screen thereof (step 723).

Referring to FIG. 8, the other embodiment of the present invention using the push method is illustrated. FIG. 8 is a flowchart showing a providing method of a digital frame service based on a home-network by using a push method according to the other embodiment of the present invention.

In this case, a frame service server is coupled with a web server for a specific service such as cy-world (hereinafter referred as a service web server) and transmits an image information such as a picture or a movie stored in the service web server to the digital frame.

When the user equipment 10 accesses the service web server 150 through a wire or wireless network and requests a frame service, the service web server 150 provides a list of the stored image information to the user equipment 10 (step 801, and 803).

The user equipment 10 selects at least one of the image information in the list and inputs a phone number of a mobile terminal of a receiver (hereinafter referred as a destination phone number) in order to recognize the digital frame which will receive the image information (step 805 and 807). The user equipment 10 transmits a demand message for requesting transmission to the service web server 150 (step 809).

The service web server 150 is on the frame service when the demand message for requesting transmission is received and transfers the demand message for requesting transmission to the frame service server 200 (step 811).

The frame service server 200 extracts a subscriber and the destination phone number from the demand message for requesting transmission and sends them to a home network management server 100 so as to request authentication of the subscriber (step 813).

When the authentication of the destination and the user equipment 10 succeeds, the frame service server 200 determines the destination phone number as an identifier of the digital frame 400. And the frame service server 200 inputs the destination phone number into an RG identifier table for recognizing an RG 300 matching the destination phone number, and confirms an IP of the RG 300 matching the destination phone number (step 815).

And then the frame service server 200 transmits the image information message to the RG 300 corresponding to the confirmed IP, and transmits a specific port number including information of the frame service in order to inform that the image information message is for the frame service (step 817).

The RG 300 grasps the specific port number included in the image information message and determines whether the service is the frame service or not through the specific port number so that the RG 300 provides the image information to the digital frame 400 (step 819).

The digital frame 400 stores the image information and displays it on a screen thereof (step 821).

What is claimed is:

1. A method for providing pictures to a digital frame based on home networks, the method comprising acts of:

A-1) matching a phone number of a mobile terminal belonging to a service destination and a digital frame ID, and recording it into an identification table for a subscriber in a frame service server connected to a home network according to a request of a user equipment connected through a wire or wireless network;

A-2) providing a list of the digital frame ID belonging to other people, which is registered in the identification table for the subscriber, and recording the digital frame ID selected by the user equipment as a specific destination in the frame service server;

A-3) grasping the specific destination through the identification table for the subscriber and storing image information into a memory area allocated to the specific destination when the frame service server receives the image information from the subscriber connected as the specific number over a wire or wireless network;

A-4) grasping the digital frame ID when the frame service server receives a transmission demand of the image information through the wire network from the digital frame connected to the home network; and A-5) searching the image information that is newly stored in the memory area matching the digital frame ID, and downloading the image information to the digital frame.

2. The method as claimed in claim 1, wherein the act of A-2) includes the acts of:
   transmitting a message for inquiring an agreement about a specific destination registration by the user equipment to the mobile terminal of the specific destination before registering; and
   recording the specific destination in the identification table for the subscriber when the specific destination permits the registration.

3. The method as claimed in claim 1, wherein the frame service server requests authentication of the user equipment to the home network management server when the user equipment is connected.

4. The method as claimed in claim 3, wherein the frame service server marks a flag indicating a new storage when the new image information is stored into the memory in the act A-3), and the frame service server determines whether to store the new image information according to the existence of the flag in the act A-4).

5. The method as claimed in claim 2, wherein the frame service server requests authentication of the user equipment to the home network management server when the user equipment is connected.

6. A method for providing pictures to a digital frame based on home networks, the method comprising acts of:
   B-1) transmitting an image information stored in a user equipment and an image information message including identification information of a service destination to a frame service server from the user equipment through a wire or wireless network;
   B-2) executing an authentication process through the image information message in the frame service server;
   B-3) inputting the identification information of the service destination into an RG (Residential Gateway) identification table, when the authentication of a subscriber succeeds;
   B-4) inquiring an IP of the RG matching the identification information of the service destination in the RG identification table, and transmitting the image information message to the IP of the RG from the frame service server, wherein the image information includes the port number information which is determined for informing a frame service; and
   B-5) transmitting the image information to a digital frame connected to the home network through the port number which is included in the received image information;

The RG connects the home network and a public network so that the frame service server connected to the public network can communicate with the digital frame.

7. The method as claimed in claim 6, wherein the identification information of the service destination is the phone number of the mobile terminal.

8. The method as claimed in claim 6, wherein the RG informs the frame service server of a new public IP allocated when a flexible IP is allocated to the RG so that the RG identification table is updated by the new public IP.

9. A method for providing pictures to a digital frame based on home networks, the method comprising acts of:
   C-1) authenticating a user equipment by using a subscriber identification information provided from the user equipment in a frame service server;
   C-2) providing a list of image information stored in a memory area corresponding to the subscriber identification information of the user equipment when the authentication succeeds in the frame service server;
   C-3) transmitting selected information related to at least one image selected in the image information list and transmitting a demand message for requesting transmission to the frame service server from the user equipment, wherein the demand message includes the identification information of the service destination;
   C-4) inputting the identification information of the service destination into the RG identification table and grasping an IP of the RG (Residential Gateway) matching the identification information of the service destination in the frame service server;
   C-5) transmitting the image information message to the IP of the RG from the frame service server, wherein the image information includes port number information which is determined for informing a frame service;
   C-6) transmitting the image information to a digital frame connected to the home network through the port number which is included in the received image information;
   The RG connects between the home network and a public network so that the frame service server connected to the public network can communicate with the digital frame.

10. The method as claimed in claim 6, wherein the identification information of the service destination is the phone number of the mobile terminal.

11. The method as claimed in claim 9, wherein the RG informs the frame service server of a new public IP allocated when a flexible IP is allocated to the RG so that the RG identification table is updated by the new public IP.

* * * * *